(12) United States Patent
Ichihara

(10) Patent No.: US 6,500,598 B2
(45) Date of Patent: *Dec. 31, 2002

(54) MULTILEVEL PHASE CHANGE OPTICAL RECORDING MEDIUM

(75) Inventor: Katsutaro Ichihara, Yokohama (JP)

(73) Assignee: Kabushiki Kaisha Toshiba, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,027
(22) Filed: Feb. 25, 1998

(65) Prior Publication Data
US 2002/0006579 A1 Jan. 17, 2002

(30) Foreign Application Priority Data
Feb. 26, 1997 (JP) .............................. 9-042242

(51) Int. Cl.⁷ .............................. G11B 7/00; G11B 7/24
(52) U.S. Cl. ............... 430/270.13; 430/945; 430/273.1; 369/275.2; 369/275.5; 369/288; 369/286; 369/284; 428/64.5; 428/912; 428/913
(58) Field of Search ........................ 430/270.13, 273.1, 430/945; 428/64.5, 913, 912; 369/275.2, 286, 284, 288, 275.5

(56) References Cited

U.S. PATENT DOCUMENTS

| | | | | |
|---|---|---|---|---|
| 5,346,740 A | * | 9/1994 | Ohno et al. | 430/945 |
| 5,419,999 A | * | 5/1995 | Uejima et al. | 430/945 |
| 5,563,852 A | * | 10/1996 | Murakami et al. | 369/275.2 |
| 5,569,517 A | * | 10/1996 | Tominaga et al. | 369/275.2 |
| 5,617,405 A | * | 4/1997 | Victora et al. | 369/275.1 |
| 5,761,188 A | * | 6/1998 | Rosen et al. | 369/275.2 |

FOREIGN PATENT DOCUMENTS

| | | | | |
|---|---|---|---|---|
| JP | 62-222442 | * | 9/1987 | 430/270.13 |
| JP | 63-268103 | * | 11/1988 | 369/275.2 |
| JP | 63-317939 | | 12/1988 | |
| JP | 01-149245 | * | 6/1989 | |
| JP | 4-209341 | | 7/1992 | |
| JP | 05-174423 | * | 7/1993 | 369/275.5 |
| JP | 05-205313 | * | 8/1993 | 369/275.5 |
| JP | 8-212551 | | 8/1996 | |
| JP | 9-7224 | | 1/1997 | |

OTHER PUBLICATIONS

Toshisuke IKEO, "Complete Translation of Reference Ikeo", Jpn. Pat. Appln. KOKAI Publication No. 63–317939, Filing No.: 62–153424, Jun. 22, 1987, pp. 1–16.

* cited by examiner

Primary Examiner—Martin Angebranndt
(74) Attorney, Agent, or Firm—Pillsbury Winthrop LLP

(57) ABSTRACT

A multilevel phase change optical recording medium comprises first to N-th ($N \geq 2$) phase change optical recording layers, wherein an i-th recording layer and a j-th recording layer, which are two recording layers arbitrarily selected from the first to N-th recording layers, meet the conditions of $T_i > T_{mi}$ and $\tau_{wi} < \tau_{xi}$, and $T_j < T_{mj}$ or $\tau_{wj} > \tau_{xj}$, with respect to a particular recording laser beam selected from recording laser beams having different power levels, where T is the maximum temperature of the recording layer in a recording operation, $T_m$ is the melting point of the recording layer, $T_x$ is the crystallizing temperature of the recording layer, $\tau_w$ is a time required for the recording layer to be cooled down from $T_m$ to $T_x$ after the laser beam irradiation, and $\tau_x$ is the crystallizing time of the recording layer.

13 Claims, 2 Drawing Sheets

MULTILEVEL PHASE CHANGE OPTICAL RECORDING MEDIUM

BACKGROUND OF THE INVENTION

The present invention relates to a phase change optical recording medium capable of multilevel recording.

Optical disk memories capable of reproducing or recording and reproducing information by laser beam irradiation are widely used as mass capacity, high-speed accessible and portable storage media for data files such as audio, video and computer data and expected for further development. In order to improve storage density of such optical disks, many techniques are proposed: for example, use of a short-wavelength gas laser for master disk cutting, use of a short-wavelength semiconductor laser as an operating light source, increasing the numerical aperture of an objective lens, reducing the thickness of the disk, and so on. For recordable optical disks, mark length recording and land-groove recording, in addition to the foregoing techniques, are proposed.

Also, as a high-density oriented technique, a method of recording and reproducing multilevel data using a multilayered recording medium has been proposed. A simplest multilayered recording medium comprises two or more recording layers, which are allocated to different focal points and accessed separately for recording or reproducing. The method may provide higher reliability in both recording and reproducing operations. However, because only one of the recording layers can be accessed at once, it is difficult to perform high-speed recording and reproducing operations.

There is proposed a magnetooptical recording medium comprising two or more recording layers arranged within the depth of focus of a laser beam with an attempt at multilevel recording in respective recording layers by using various levels of laser power or recording field intensity and multilevel reproducing by analog processing of read-out signals. The read-out signals from such a magnetooptical recording medium are, however, based on slight Kerr rotation angle from which a desirable level of carrier-to-noise ratio (CNR) can only be obtained by binary digital processing. Therefore, it will hardly be feasible to subject the read-out signals to successful multilevel analog processing.

On the other hand, in a phase change optical recording medium, particularly rewritable medium, intense read-out signals can be obtained, so that it is expected to realize multilevel processing. However, such a multilayered phase change optical recording medium capable of recording and reproducing multilevel data simultaneously at a high speed has not yet been in practical use.

BRIEF SUMMARY OF THE INVENTION

It is an object of the present invention to provide a multilayered phase change optical recording medium that is capable of recording and reproducing multilevel data at a high speed.

A multilevel phase change optical recording medium according to the present invention comprises first to N-th phase change optical recording layers ($N \geq 2$), wherein an i-th recording layer and a j-th recording layer, which are two recording layers arbitrarily selected from the first to N-th recording layers, meet the conditions of:

$T_i > T_{mi}$ and $\tau_{wi} < \tau_{xi}$, and $T_j < T_{mj}$ or $\tau_{wj} > \tau_{xj}$, with respect to a particular recording laser beam selected from recording laser beams having different power levels, where T is the maximum temperature of the recording layer in a recording operation, $T_m$ is the melting point of the recording layer, $T_x$ is the crystallizing temperature of the recording layer, $\tau_w$ is a time required for the recording layer to be cooled down from $T_m$ to $T_x$ after the laser beam irradiation, and $\tau_x$ is the crystallizing time of the recording layer.

A method of recording and reproducing for a multilevel phase change optical recording medium comprising two or more recording layers having different melting points and/or crystallizing temperatures according to the present invention comprises the steps of: irradiating the multilevel phase change optical recording medium with recording beams having different power levels, thereby performing recording; and irradiating the recorded multilevel phase change optical recording medium with a reproducing beam to detect reproducing signals, followed by digitizing the reproducing signals, thereby performing reproducing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in more detail.

Figure 1:
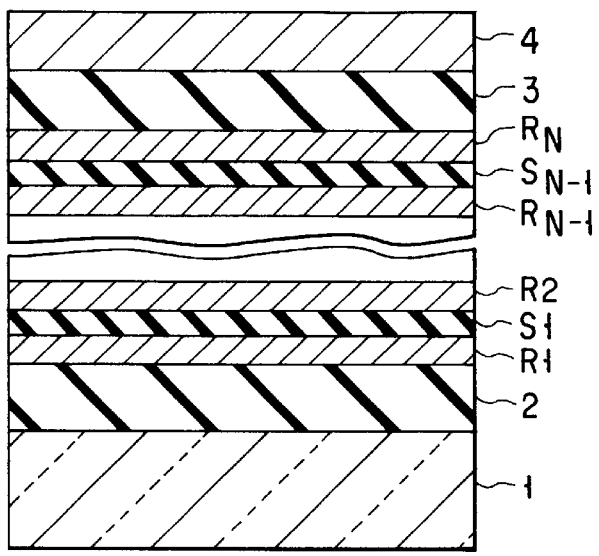
FIG. 1 is a cross sectional view of the multilayered multilevel phase change optical recording medium according to the present invention.

FIG. 1 is a cross sectional view of a multilevel phase change optical recording medium according to the present invention. As shown in FIG. 1, a lower protective layer 2 is formed on a substrate 1. On the lower protective layer 2, there are alternately provided, from the lower side where a laser beam is incident on, first to N-th ($N \geq 2$) recording layers $R_1, R_2, \ldots, R_{N-1}$ and $R_N$, and intermediate layers $S_1, \ldots$ and $S_{N-1}$. On the uppermost recording layer $R_N$, an upper protective layer 3 and a reflective layer 4 are formed. For recording data on the phase change optical recording medium, a plurality of recording laser beams having different power levels is used. The phase change optical recording layers are located within the depth of focus of each of the laser beams.

Figure 2A:
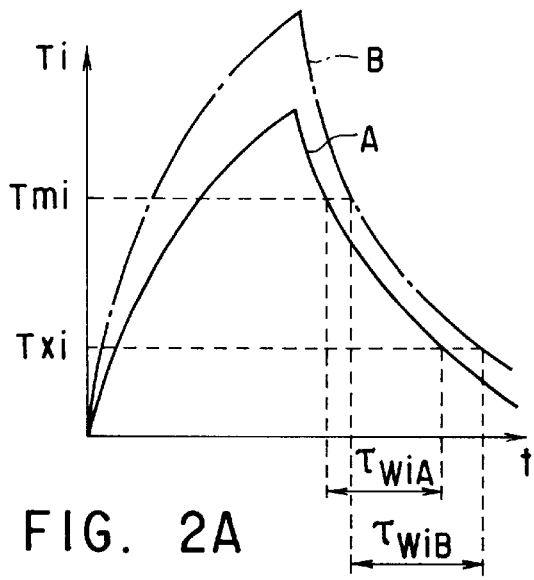
FIGS. 2A and 2B are diagrams showing the thermal response of two recording layers (i-th and j-th layers) in the multilayered multilevel phase change optical recording medium of the present invention.
Figure 2B:
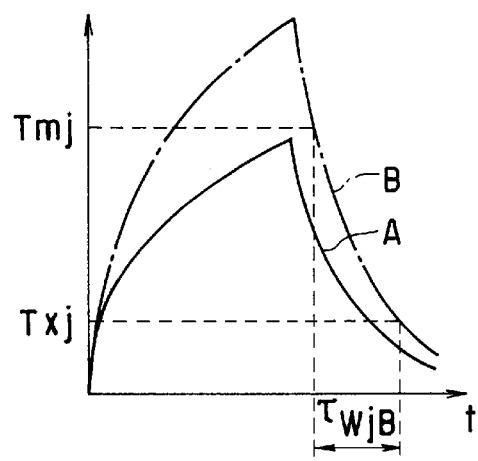

Now, let us study two recording layers, referred to as the i-th layer and the j-th layer ($1 \leq i$, $2 \leq j$, and $i \neq j$), which are arbitrarily selected from the first to N-th recording layers $R_1$ to $R_N$ constituting the phase change optical recording medium of the present invention. FIGS. 2A and 2B show the thermal responses of the i-th and j-th layers, respectively, when these layers are irradiated with the recording laser beams. In these diagrams, two profiles denoted by the letters "A" and "B" represent thermal responses corresponding to two recording laser beams different in power level, respectively. The power levels of the two laser beams are in a relationship of A<B.

The important factors in phase change optical recording are the maximum temperature and the time response during cooling of the recording layer. Now, assume that T is a maximum temperature of the recording layer in a recording operation, $T_m$ is the melting point of the recording layer, $T_x$ is the crystallizing temperature of the recording layer, $\tau_w$ is a time required for the recording layer to be cooled from $T_m$ to $T_x$ after the laser beam irradiation, and $\tau_x$ is the crystallizing time of the recording layer. The above values for the i-th and j-th layers are represented by subscripts "i" and "j", respectively.

First, the thermal responses when the recording layers are irradiated with the recording laser beam "AA" are described. The i-th layer is heated up to higher than its melting point $T_{mi}$ and takes a time $\tau_{wiA}$ to be cooled down from the melting point $T_{mi}$ to the crystallizing temperature $T_{xi}$. Amorphous recording marks are formed in the i-th layer if the crystallizing time $t_{xi}$ of the i-th layer is longer than the time $\tau_{wiA}$, whereas no recording marks are formed in the contrary case. Here, assume that the recording marks are formed in the i-th layer. The j-th layer is restrained its temperature raise by making use of a material having higher melting point $T_{mj}$ or by the effect of the intermediate layer. In the j-th layer, the maximum temperature $T_j$ is lower than the melting point $T_{mj}$. Accordingly, no recording marks are formed in the j-th layer regardless of the cooling speed. Therefore, with respect to the recording laser beam "A", the conditions of $T_i > T_{mi}$ and $\tau_{wi} > \tau_{xi}$ for i-th layer, and $T_j < T_{mj}$ for j-th layer are established simultaneously. This permits the recording laser beam "A" to form recording marks in the i-th layer selectively.

Next, the thermal responses when the recording layers are irradiated with the recording laser beam "B" are described. The laser beam "B" is higher in intensity compared with the laser beam "A" and causes the i-th layer to rise up far over the melting point $T_{mi}$. The cooling time $\tau_{wiB}$ of the i-th layer is longer than the cooling time $\tau_{wiA}$. Amorphous recording marks are formed in the i-th layer if the crystallizing time $\tau_{xi}$ ($>\tau_{wiA}$) of the i-th layer is longer than the time $\tau_{wiB}$, whereas no recording marks are formed in the contrary case. Any one of the two cases may be selected depending on involved conditions. Here, assume that the recording marks are also formed in the i-th layer under the power level "B". When the laser beam "B" is used, the j-th layer is heated up to higher temperature than the melting point $T_{mj}$ with the cooling time being $\tau_{wjB}$. Recording marks are. formed in the j-th layer if the crystallizing time $\tau_{xj}$ of the j-th layer is greater than $\tau_{wjB}$, whereas no recording marks are formed in the contrary case. Here, assume that the recording marks are also formed in the j-th layer.

Although not shown in FIGS. 2A and 2B in order to avoid complexity, when a recording laser beam "C" having a higher power level than that of the laser beam "B" is used, thermal responses are as follows. In this case, both the i-th and j-th layers are heated up to higher temperatures than their melting points. When the cooling time $\tau_{wiC}$ of the i-th layer is longer than $\tau_{xi}$ ($>\tau_{wiB}$), no recording marks are formed in the i-th layer. If the cooling time $\tau_{wjC}$ of the j-th layer is shorter than $\tau_{xj}$ ($>\tau_{wjB}$), recording marks are formed in the j-th layer.

Table 1 shows the relationship between recording power levels and whether recording marks are formed or not. In the Table 1, the case where the recording marks are formed is expressed by "1", and the case where no recording marks are formed is expressed by "0". Note that "O" means a power level lower than the threshold for forming recording marks in the i-th layer.

TABLE 1

|  | Power level | | | |
|---|---|---|---|---|
|  | O | A | B | C |
| i-th layer | 0 | 1 | 1 | 0 |
| j-th layer | 0 | 0 | 1 | 1 |

As apparent from Table 1, the phase change optical recording medium of the present invention can attain four different recording states by irradiating two recording layers, which are different in thermal response, with recording laser beams having different power levels. On the other hand, conventional phase change recording medium permits only two recording states of "0" and "1". Accordingly, the present invention can improve recording density to two times greater than that of the conventional recording medium. Even if the selection of power level corresponding to the recording laser beam "C" shown in Table 1 is not allowed, the recording density can be improved by 1.5 times greater than that of the conventional recording medium. Moreover, the two recording layers can be accessed simultaneously, so that the high-speed recording operation can be possible.

Furthermore, more than two recording layers may be used for multilevel recording, although design of the recording medium becomes difficult. In principle, with respect to a recording medium having N recording layers, recording density can be improved to $2^N$ times at maximum, to 2N times even if a large design margin is taken into account, and to (N+1)/2 times at least.

The phase change optical recording medium of the present invention is reproduced by continuously irradiating tracks on which recording patterns are formed with a laser beam having a read-out level. In this operation, a plurality of output levels is obtained depending on recording states. Intensity of output signals from the phase change optical recording medium is high enough, and a difference between output levels is also high enough. Therefore, a multilevel processing can be easily performed.

An example of the present invention will now be described referring to the accompanying drawings.

Figure 3:
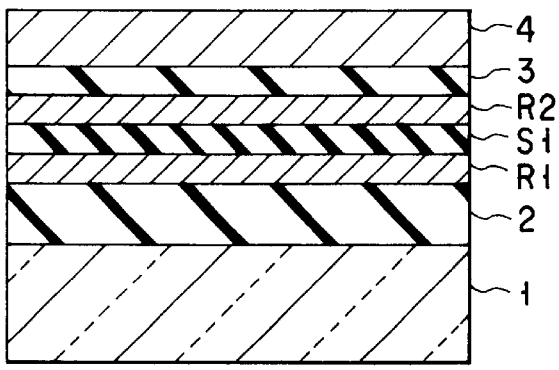
FIG. 3 is a cross sectional view showing an example of the multilayered multilevel phase change optical recording medium of the present invention.

FIG. 3 is a cross sectional view of the multilayered multilevel phase change optical recording medium in this example. As shown in FIG. 3, a lower protective layer 2 is formed on a substrate 1. On the lower protective layer 2, there are provided a first recording layer (the i-th layer) $R_1$, an intermediate layer $S_1$, a second recording layer (the j-th layer) $R_2$, an upper protective layer 3, and a reflective layer 4. The thicknesses of these layers are so adjusted that the first and second recording layers are located within the depth of focus of recording laser beams.

Figure 4:
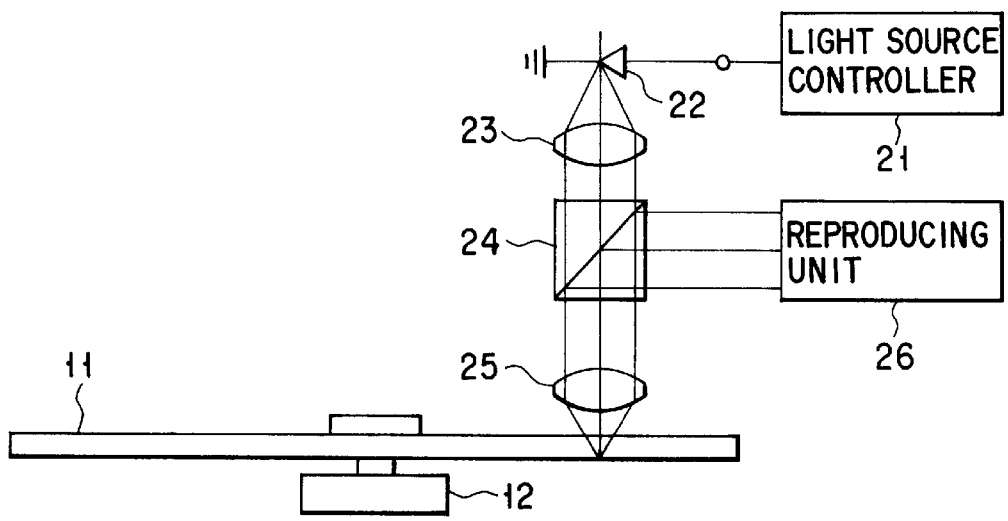
FIG. 4 is a schematic view of an optical disk drive used in the present invention.

FIG. 4 illustrates the construction of an optical disk drive used for recording and read-out operations. The optical disk 11 shown in FIG. 3 is mounted to a rotary shaft of a spindle motor 12. In recording operation, a laser 22 is operated by a light source controller 21 to emit a short-pulsed laser beam having a relatively high power level. The laser beam is passed through an objective lens 23, a half mirror 24 and a focusing lens 25 and then is incident onto the optical disk 11, thereby forming recording marks. In the read-out operation, a laser 22 is operated to emit a laser beam having a low power level. The laser beam is incident onto the optical disk 11 on which recording marks are formed. The laser beam reflected from the optical disk 11 is passed through the focusing lens 25 and reflected by the half mirror 24, and then is sent to the reproducing unit 26 where reflectance change between recording marks and non-recorded region is detected.

The optical disk drive has substantially similar arrangement to a conventional type, but the laser 22 can emit recording laser beams having different power levels by multilevel power modulation.

The operational conditions of the optical disk drive are as follows: linear velocity of the disk is 10 m/s, recording pulse frequency is 10 MHz, recording pulse width is 50 ns, laser beam wavelength is 650 nm, and numerical aperture (NA) of the objective lens is 0.6. When NA of the objective lens is 0.6, full width at half maximum (FWHM) of the beam spot becomes about 0.5 $\mu$m. The recording pulse width of 50 ns is substantially equal to duration within which FWHM of the beam spot passes the recording layer. This example uses recording laser beams having four. different power levels of 6 mW, 9 mW, 12 mW and 15 mW corresponding to the power levels "O", "A", "B" and "C" shown in Table 1.

The thermal characteristics of the first and second recording layers are so adjusted that they meet suitable conditions for multilevel recording. The thermal conductivity and thickness of other layers are also designed in accordance with the thermal characteristics of the recording layers.

In this example, the first recording layer consists of 15 nm-thick $Ge_2Sb_2Te_5$, and the second recording layer consists of 15 nm-thick $Ge_2Sb_2Te_5+5$ at %-Sb. The first recording layer has a melting point $T_{m1}$ of 630° C. and a crystallizing time $\tau_{x1}$ of 50 ns. The second recording layer has a melting point $T_{m2}$ of 630° C., equal to that of the first recording layer, and a crystallizing time $\tau_{x2}$ of 70 ns. The lower protective layer 2 consists of about 150 nm-thick $ZnS-SiO_2$, the intermediate layer $S_1$ consists of polytetrafluoroethylene (PTFE) which is a good thermal insulator, the upper protective layer 3 consists of 20 nm-thick Si-N which is high in heat radiating effect, and the reflective layer 4 consists of 50-nm thick Al having a high thermal conductivity. These layers are deposited by conventional magnetron sputtering.

Thermal responses of both recording layers calculated from the above conditions are as follows: When the recording laser beams having power levels of 6 mW, 9 mW, 12 mW and 15 mW are used, respectively, the maximum temperatures will be 500° C., 700° C., 900° C. and 1100° C. for the first recording layer, and 450° C., 600° C., 750° C. and 900° C. for the second recording layer.

Also, calculated values of duration within which the recording layers are retained below the melting point and above the crystallizing temperature in the cooling process after the irradiation of recording laser beams of various power levels (referred to as a cooling time hereinafter) are as follows. The cooling times for the first recording layer will be 30 ns, 45 ns and 60 ns corresponding to the power levels of "A", "B" and "C", respectively. The maximum temperature of the second recording layer is maintained below the melting point in the case where the power level "A", so that there is no need to consider its cooling time. The cooling times for the second recording layer will be 30 ns and 50 ns corresponding to the power levels of "B" and "C", respectively.

As described above, the second recording layer is lower in the maximum temperature and shorter in the cooling time compared with the first recording layer. This can be explained by the fact that the recording laser beam is incident onto the side of the first recording layer, temperature difference between the first and second recording layers is maintained because the intermediate layer having a low thermal conductivity, and heat is taken away from the second recording layer through the upper protective layer and the reflective layer having a high thermal conductivity.

Judging from the relationship between the maximum temperature and the cooling time of each recording layer, recording marks will be formed neither first nor second layers if the power level is "O", will be formed only in the first recording layer if the power level is "A", will be formed in both first and second recording layers if the power level is "B", and will be formed only in the second recording layer if the power level is "C".

The actual operations of recording and reproducing by the optical disk drive shown in FIG. 4 are as follows. While the spindle motor is operated to rotate the optical disk at a linear speed of 10 m/s, a laser beam spot having a read-out power level (for example, 1 mW) is focused on a desired track of the optical disk and then recording is performed by using laser beams having different recording power levels. Read-out is performed by continuously irradiating the recorded tracks with a laser beam having a read-out power level to detect read-out signals.

Figure 5A:
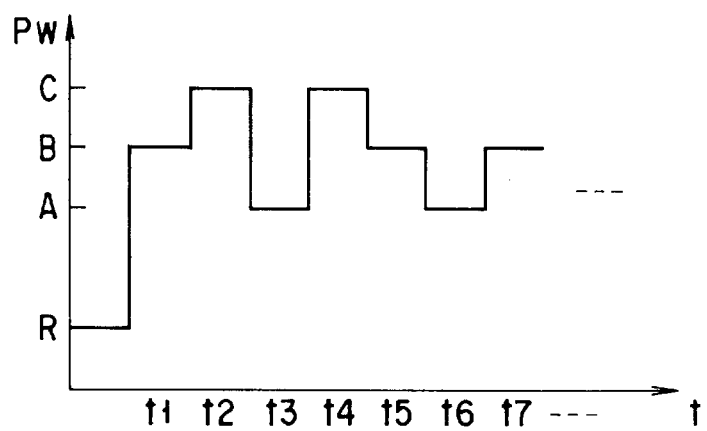
FIGS. 5A and 5B are diagrams showing recording signals and reproducing signals in the multilayered multilevel phase change optical recording medium of the present invention.

FIG. 5A shows an example of recording signal train. This diagram represents that recording is performed by irradiating a track with recording laser beams having three different power levels of "A", "B" and "C" after the irradiation of laser beam having a read-out power level R. The recording frequency is set to 10 MHz. In FIG. 5A, the power level is set to "B" during the period of time $t_1$, $t_5$, and $t_7$, to "C" during the period of time $t_2$ and $t_4$, and to "A" during the period of time $t_3$ and $t_6$. In a sequence of $t_1$ to $t_7$, a recording pattern of "1010111" is formed in the first recording layer, and simultaneously, another recording pattern of "110110" is formed in the second recording layer.

Figure 5B:

The read-out signals are shown in FIG. 5B. The read-out signals include a peak level at a position where recording marks are formed in both first and second recording layers, a bottom level (without including the non-recording level) at a position where a recording mark is formed in only the second recording layer, and an intermediate level at a position where a recording mark is formed in only the first recording layer. This result can be explained by the fact that reflected laser beam from the first recording layer is directly incident upon the detecting system, whereas reflected laser beam from the second recording layer passes through the first recording layer and is then incident upon the detecting system.

The read-out signals shown in FIG. 5B can be digitized by setting windows with appropriate slice levels including the individual output levels, even if the output level is fluctuated to some extent. For example, the output levels of "A", "B" and "C" may be digitized to "10", "11", and "01". Assuming that the non-recording level is "00", the recording and read-out can be performed at as a high density as two times that of the conventional medium.

The material of the recording layer is not limited to GeSbTe-based material employed in the above example and may be selected from other phase change optical recording materials including InSbTe-based and GeSbTe-based materials. Although the thermal responses of the recording layers in the above example are adjusted by varying the composition in the same material system, they may be controlled by using two or more materials having appropriate melting points and crystallizing times.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of recording and reproducing for a multilevel phase change optical recording medium comprising first to N-th (N≥2) phase change optical recording layers, wherein an i-th layer and a j-th layer, which are two recording layers arbitrarily selected from the first to N-th recording layers and located within the depth of focus of a plurality of laser beams having different power levels, meet the conditions of:

$T_i > T_{mi}$ and $\tau_{wi} < \tau_{xi}$, and $T_j < T_{mj}$ or $\tau_{wj} > \tau_{xj}$, with respect to a particular recording laser beam selected from the plurality of recording laser beams, where T is the maximum temperature of the recording layer in a recording operation, $T_m$ is the melting point of the recording layer, $T_x$ is the crystallizing point of the recording layer, $\tau_w$ is a time required for the recording layer to be cooled down from $T_m$ to $T_x$ after the laser beam irradiation, and $\tau_x$ is the crystallizing time of the recording layer and wherein said method comprises:

irradiating the multilevel phase change optical recording medium with recording beams having different power levels, thereby performing recording; and irradiating the recorded multilevel phase change optical recording medium with a reproducing beam to detect reproducing signals, followed by digitizing the reproducing signals, thereby performing reproducing wherein all of the beams come from the same side and have the same wavelength, wherein three recording beams each different in power level are used for recording the i-th layer and the j-th layer, and wherein a recording beam having a first power level is used for recording only in the i-th recording layer, a recording beam having a second power level is used for recording both the i-th and j-th recording layers, and a recording beam having a third power level is used for recording only the j-th recording layer.

2. A method according to claim 1 wherein the first power level is a lower power level, the second power level is an intermediate power level, and the third power level is a higher power level.

3. A method according to claim 1, wherein the j-th layer is lower in the maximum temperature and shorter in the cooling time compared with the i-th layer.

4. A method according to claim 1, wherein said medium further comprises an intermediate layer having lower thermal conductivity than that of the recording layer and provided on the j-th layers.

5. A method according to claim 1, wherein said medium further comprises an upper protective layer and a reflective layer on the j-th layer, wherein the upper protective layer has a higher thermal conductivity than that of the recording layer.

6. A method according to claim 1, wherein the i-th layer consists of $Ge_2Sb_2Te_5$ and the j-th layer consists of $Ge_2 Sb_2 Te_5$ with 5% of Sb.

7. The method according to claim 1, wherein the i-th layer is closer to the substrate than the j-th layer.

8. A method for recording and reproducing for a multilevel phase change optical recording medium, said method comprising:

(i) providing a multilevel phase change optical recording medium which comprises:

first through $N^{th}$ phase change recording layers, N being greater than or equal to two, said recording layers including an i-th and a j-th layer each being arbitrarily selected from said recording layers, said i-th layer having (a) a temperature of $T_{mi}$ at which said i-th layer melts, (b) a time period of $\tau_{wi}$ which is required for said i-th layer to cool from $T_{mi}$ to a temperature of $T_{xi}$ at which said i-th layer crystallizes, and (c) a time period of $\tau_{xi}$ which is required for said i-th layer to crystallize, said j-th layer having (a) a temperature of $T_{mj}$ at which said j-th layer melts, (b) a time period of $\tau_{mj}$ which is required for said j-th layer to cool from $\tau_{mj}$ to a temperature of $T_{xj}$ at which said j-th layer crystallizes, and (c) a time period of $\tau_{xj}$ which is required for said j-th layer to crystallize;

(ii) irradiating said recording layers with recording beams having different power levels such that, for a selected recording beam of a given power level:

(a) $T_i > T_{mi}$ and $\tau_{wi} < \tau_{xi}$, and (b) $T_j < T_{mj}$ or $\tau_{wj} > \tau_{xj}$, wherein $T_i$ and $T_j$ are the maximum temperatures to which said selected recording beam respectively heats said i-th and j-th recording layers whereby the selected recording beam forms amorphous recording marks on said i-th layer without forming recording marks on said j-th layer and wherein a recording beam having a lower power level is used only for recording in the i-th recording layer, a recording beam having an intermediate power level is used for recording in both the i-th and j-th recording layers, and a recording beam having a higher power level is used for recording only in the j-th recording layer;

(iii) then irradiating the recording layers of the recorded multilevel phase change recording medium with a reproducing beam to form reproducing signals which are reflected from said recording layers; and (iv) thereafter digitizing the reflected reproducing signals.

9. The method according to claim 8, wherein the i-th layer is closer to the substrate than the j-th layer.

10. The method according to claim 8, wherein the j-th layer is lower in the maximum temperature and shorter in the cooling time compared with the i-th layer.

11. A multilevel phase change optical recording medium for use in conjunction with recording laser beams having different power levels during a recording operation, said medium comprising:

first to Nth rewritable phase change optical recording layers, N being greater than or equal to two, wherein said recording layers have different compositions and are separated by intermediate layers and are arranged within a depth of focus of a laser beam;

said recording layers including an i-th recording layer and a j-th recording layer each being arbitrarily selected from said recording layers and having the following characteristics for a recording beam selected from the aforementioned recording laser beams having different power levels:

$T_i > T_{mi}$ and $\tau_{wi} < \tau_{xi}$, and $T_j < T_{mj}$ or $\tau_{wj} > \tau_{xj}$, wherein $T_i$ and $T_j$ are the maximum temperatures to which the selected laser beam respectively heats said i-th and j-th recording layers during the recording operation, $T_{mi}$ and $T_{mj}$ are the temperatures at which said i-th and j-th recording layers will respectively melt, $\tau_{wi}$ and $\tau_{wj}$ are the times required for said i-th and j-th recording layers to respectively cool from $T_{mi}$ and $T_{mj}$ to respective crystallizing temperatures $T_{xi}$ and $T_{xj}$ for each of said i-th and j-th layers, and $\tau_{xi}$ and $\tau_{xj}$ are the times required for said i-th and j-th layers to respectively crystallize; and said medium further comprising an upper protective layer and a reflective layer on the j-th layer, wherein the upper protective layer has a higher thermal conductivity than that of the recording layer.

12. The combination according to claim 11, wherein the i-th layer is closer to the substrate than the j-th layer.

13. The medium according to claim 11, wherein the j-th layer is lower in the maximum temperature and shorter in the cooling time compared with the i-th layer.

* * * * *